(12) United States Patent
Hans et al.

(10) Patent No.: US 8,787,254 B2
(45) Date of Patent: *Jul. 22, 2014

(54) METHOD FOR OPERATING A MOBILE WIRELESS NETWORK

(75) Inventors: Martin Hans, Hildesheim (DE); Mark Beckmann, Hameln (DE)

(73) Assignee: IPCom GmbH & Co. KG (DE)

( * ) Notice: Subject to any disclaimer, the term of this patent is extended or adjusted under 35 U.S.C. 154(b) by 227 days.

This patent is subject to a terminal disclaimer.

(21) Appl. No.: 12/953,151

(22) Filed: Nov. 23, 2010

(65) Prior Publication Data

US 2011/0292872 A1  Dec. 1, 2011

Related U.S. Application Data

(63) Continuation of application No. 12/589,136, filed on Oct. 19, 2009, now Pat. No. 8,208,428, which is a continuation of application No. 11/825,330, filed on Jul. 6, 2007, now Pat. No. 7,609,726, which is a continuation of application No. 10/111,511, filed as application No. PCT/DE00/03247 on Sep. 19, 2000, now Pat. No. 7,245,636.

(30) Foreign Application Priority Data

Oct. 21, 1999 (DE) .................. 199 50 653

(51) Int. Cl.
*H04W 4/00* (2009.01)
(52) U.S. Cl.
USPC .......................................... 370/328
(58) Field of Classification Search
USPC .......................................... 370/328
See application file for complete search history.

(56) References Cited

U.S. PATENT DOCUMENTS

| 5,533,029 A | 7/1996 | Gardner |
| 5,535,199 A | 7/1996 | Amri et al. |

(Continued)

FOREIGN PATENT DOCUMENTS

| DE | 19847679 | 5/1990 |
| DE | 19944334 | 12/2000 |

(Continued)

OTHER PUBLICATIONS

"Decision and Translation of the Decision regarding the opposition to European Patent 1226692", Jan. 15, 2010, 74 pages.

(Continued)

*Primary Examiner* — Noel Beharry
(74) *Attorney, Agent, or Firm* — Kilpatrick Townsend & Stockton LLP

(57) ABSTRACT

A method of operating a mobile wireless network is described to ensure proper function of protocol entities during the transmission of data units between two wireless stations of the mobile wireless network. In this case, user data is assembled by a first convergence protocol layer of the first wireless station into at least one first data unit, particularly a packet data unit, before transmission to a second convergence protocol layer of a second wireless station, particularly on the same protocol level, with the user data being supplied to the first convergence protocol layer by at least one user in a network layer. At least one protocol entity of the first convergence protocol layer is configured as a function of a configuration request received by the second wireless station, in order to form the at least one first data unit from the data received from the at least one user and to transmit it through a carrier to a link control layer.

15 Claims, 4 Drawing Sheets

(56) References Cited

U.S. PATENT DOCUMENTS

| | | | |
|---|---|---|---|
| 5,553,314 | A | 9/1996 | Grube et al. |
| 5,818,871 | A | 10/1998 | Blakeney et al. |
| 5,936,966 | A | 8/1999 | Ogawa et al. |
| 5,978,386 | A | 11/1999 | Hamalainen et al. |
| 5,987,022 | A | 11/1999 | Geiger et al. |
| 6,072,388 | A | 6/2000 | Kyrtsos |
| 6,111,866 | A | 8/2000 | Kweon et al. |
| 6,205,140 | B1 | 3/2001 | Putzolu et al. |
| 6,278,706 | B1 | 8/2001 | Gibbs et al. |
| 6,396,828 | B1 | 5/2002 | Liu |
| 6,400,722 | B1 | 6/2002 | Chuah et al. |
| 6,404,754 | B1 | 6/2002 | Lim |
| 6,421,374 | B2 | 7/2002 | Blakeney et al. |
| 6,434,133 | B1 * | 8/2002 | Hamalainen ............ 370/338 |
| 6,434,168 | B1 | 8/2002 | Kari |
| 6,483,822 | B1 | 11/2002 | Lioy et al. |
| 6,504,836 | B1 | 1/2003 | Li et al. |
| 6,535,979 | B1 | 3/2003 | Vialen et al. |
| 6,611,533 | B1 | 8/2003 | Liao et al. |
| 6,658,235 | B1 | 12/2003 | Tolmunen et al. |
| 6,717,928 | B1 | 4/2004 | Kalliokulju et al. |
| 6,848,008 | B1 | 1/2005 | Sevanto et al. |
| 7,003,296 | B2 | 2/2006 | De Montgolfier |
| 7,245,636 | B1 | 7/2007 | Hans et al. |
| 7,460,475 | B2 | 12/2008 | Tourunen et al. |
| 7,554,935 | B2 | 6/2009 | Leppisaari et al. |
| 8,208,428 | B2 | 6/2012 | Hans et al. |
| 2004/0121771 | A1 | 6/2004 | Song et al. |
| 2005/0050429 | A1 | 3/2005 | Proctor, Jr. |
| 2011/0286388 | A1 | 11/2011 | Hans et al. |
| 2012/0057528 | A1 | 3/2012 | Hans et al. |

FOREIGN PATENT DOCUMENTS

| | | |
|---|---|---|
| EP | 1226692 | 7/2002 |
| GB | 2254523 | 10/1992 |
| JP | 10512120 | 11/1998 |
| JP | 2000513519 | 10/2000 |
| JP | 2001522182 | 11/2001 |
| WO | 96021984 | 7/1996 |
| WO | 9748212 | 12/1997 |
| WO | 9848528 | 10/1998 |
| WO | 9922557 | 5/1999 |

OTHER PUBLICATIONS

"ESTI 3 GPP TS 25 301 Radio Interface Protocol Architecture", Mar. 10, 2002, 43 pages.
"ETSI TS 125323 V3.3.0; Universal Mobile Telecommunications System (UMTS)", Sep. 30, 2009, 18 pages.
"Tdoc NP-99260. Change Request A043r1 of 6-8.10.1", Oct. 6, 1999, 2 pages.
"3G Change Request—25.331—3GPP TSG-Ran, Meeting #6, Nice, France", Dec. 13, 1999, 14 pages.
"3G TS 24.065 V3.1.0, 3rd Generation Partnership Project; Technical Specification Core Group Network", 8/00/1999, 42 pages.
"3G TS RAN 25.323 V0.1.0—PDCT Protocol Specification", 9/00/1999, 10 pages.
"3G TS23.107 V3.0.0, Technical Specification Group Services and System Aspects;, QoS Concept and Architecture", 10/00/1999, 34 pages.
"3G TS24.007 V3.1.0, Technical Specification Group Core Network; Mobile radio interface signalling layer 3; General Aspects", 10/00/1999, 126 pages.
"3GPP TS 25.301 V3.2.0", 10/00/1999, 51 pages.
"3GPP TS 25.301 V3.2.0—Radio Interface Protocol Architecture", 10/00/1999, 52 pages.

"3GPP TS 25.331 V1.1.0—RRC Protocol Specification", 06/00/1999, 84 pages.
"3GPP TS25.301 V8.4.0, Technical Specification Group Radio Access Network; Radio Interface Protocol Architecture (Release 8)", 12/00/2008, 52 pages.
"3GPP TSG-RAN meeting #5, Document RP-99??, 3G Change Request TS25.301 CR008", Oct. 6, 1999, 15 pages.
"3GPP TSG-RAN meeting #5, Document RP-99575, 3G Change Request TS25.301 CR008", Oct. 6, 1999, 15 pages.
"Decision of the Board of Appeal 3.5.05.", Opposition Division of the European Patent Office, European patent No. 1226692, Oct. 24, 2011, 60 pages.
"Draft EN 301 344 V6.1.1; Digital Cellular Telecommunications system, General Packet Radio Service Stage 2", 08/00/1998, 3 pages.
"Draft ETSI EN 301 344 V7.1.0, Digital cellular telecommunications system; General Packet Radio Service , Stage 2", 08/00/1999, 116 pages.
"ETSI TS 101 297 V7.0.0", GSM Global System for Mobile Communications, 09/00/1999, 42 pages.
"ETSI TS 101 351 V7.0.0; General Packet Radio Service; Mobile Station—Serving GPRS Support Node, Logital Link Control (LLC) layer specification (GSM 04.64 V7.0.0)", 08/00/1999, 60 pages.
"ETSI TS 125 323 V3.3.0; Universal Mobile Telecommunications System (UMTS)", 9/00/2009, 18 pages.
"Extract from www.3gpp.org indicating publication of O6", 3GPP Specification detail, 3GPP TS 25.301, Sep. 8, 2009, 3 pages.
"RFC 1144 Compressing TCP/IP Headers for Low Speed Serial Links", 2/00/1990, 45 pages.
"RFC 2507 "IP Header Compression"", M. Degermark, 2/00/1999, 47 pages.
"Tdoc NP-99260, Change Request A043r1 of 6-8.10.1", Oct. 6, 1999, 2 pages.
"TR 25.990 V0.1.4, 3rd Generation Partnership Project (3GPP); Technical Specification Group (TSG) RAN", 06/00/1999, 18 pages.
"TS 24.008 V3.1.0, 3rd Generation Partnership Project: Universal Mobile Telecommunications System", 10/00/1999, 248 pages.
"TS 25.331 V1.4.2", RRC Protocol Specification, 09/00/1999, 33 pages.
"TS25.301 V3.1.0, 3rd Generation Partnership Project (3GPP); Radio Interface Protocol Architecture", 06/00/1999, 48 pages.
"TSG-RAN Working Group 2 (Radio L2 and Radio L3), TSGR2#7(99)a01, Draft minutes of WG2 meeting #6,", Sep. 20, 1999, 38 pages.
"TSG-RAN Working Group 2 (Radio L2 and Radio L3); TSGR2#8(99); Draft Minutes of WG2 meeting #7", Sep. 20, 1999, 44 pages.
"TSG-RAN Working Group 2 (Radio layer 2 and Radio layer 3), TSGR2#6(99)769, CR to 25.301 on L3CE", Aug. 16, 1999, 21 pages.
"TSG-Ran Working Group 2 (Radio layer 2 and Radio layer 3), TSGR2#7(99)c25; Proposed TS25.323; PDCP Protocol Specification", Sep. 20, 1999, 10 pages.
"TSG-RAN Working Group 2 (Radio layer 2 and Radio layer 3); TSGR2#7(99)b30; Malmo", Sep. 20, 1999, 8 pages.
"TSG-Ran Working Group1 meeting #2, TSGR1#2(99)083, Possibility to use STTD on PCCPCH", Feb. 22, 1999, 10 pages.
U.S. Appl. No. 12/589,136 , "Notice of Allowance", Feb. 23, 2012, 22 pages.
U.S. Appl. No. 13/244,979 , "Notice of Allowance", Mar. 2, 2012, 19 pages.
U.S. Appl. No. 13/244,979 , "Notice of Allowance Received", Jun. 25, 2012, 9 pages.
U.S. Appl. No. 12/953,085 , "Notice of Allowance", Jan. 18, 2013, 8 pages.
U.S. Appl. No. 13/606,993 , "Notice of Allowance", Jan. 18, 2013, 8 pages.

* cited by examiner

METHOD FOR OPERATING A MOBILE WIRELESS NETWORK

CROSS-REFERENCE TO RELATED APPLICATIONS

This application is a continuation of U.S. patent application Ser. No. 12/589,136 filed Oct. 19, 2009, which is a continuation of U.S. patent application Ser. No. 11/825,330 filed Jul. 6, 2007, which issued as U.S. Pat. No. 7,609,726 on Oct. 27, 2009, which is a continuation of U.S. patent application Ser. No. 10/111,511, filed Sep. 17, 2002, which issued as U.S. Pat. No. 7,245,636 on Jul. 17, 2007 (which is a U.S. national stage application of PCT international application number PCT/DE00/03247) and which claims the benefit of priority of PCT international application number PCT/DE00/03247 having an international filing date of Sep. 19, 2000, and designating the United States of America, which claims priority to German patent application DE 19950653 filed Oct. 21, 1999, the entire contents of all of the foregoing are hereby expressly incorporated herein by reference.

This application is related to U.S. patent application Ser. No. 12/953,085 filed concurrently herewith, the entire contents of which are hereby expressly incorporated herein by reference.

FIELD OF THE INVENTION

The present invention relates to a method for operating a mobile wireless network.

BACKGROUND INFORMATION

A method for operating a mobile wireless network is described in German Published Patent Application No. 199 44 334 in which data is assembled into at least one unit, particularly a packet data unit, by a first convergence protocol layer before transmission to a second convergence protocol layer, particularly on the same protocol level, with the data being supplied to the first convergence protocol layer by a user in a network layer.

SUMMARY OF THE INVENTION

In an example method according to the present invention at least one protocol entity of the first convergence protocol layer may be configured as a function of a configuration request received from a second wireless station in order to form at least one first data unit from the data received from the at least one user and may transmit it to a link control layer through a carrier. In this manner, protocol entities may be generated in the first wireless station whose settings and function may be identical to the settings and function of corresponding protocol entities of the second wireless station, so that proper functioning of the protocol entities may be ensured during the transmission of the data units between the two wireless stations.

The example method may be refined and improved.

Using the configuration request, at least one selection for alternative settings for the protocol entity, which may be supported by the second wireless station, may be predetermined. In this manner, the first wireless station may select the most favorable setting for a first wireless device from the alternative settings as a function of its own capabilities or its own output range and/or as a function of a user preset.

A confirmation signal may be transmitted from the first wireless station to the second wireless station in which the setting selected and performed by the first wireless station is communicated to the second wireless station. In this manner, the second wireless station may configure its at least one protocol entity as a function of the setting performed for the first wireless station, in order to ensure proper functioning of the protocol entities during the transmission of the data units between the two wireless stations.

During the configuration, a protocol entity ID may be specified, through which the protocol entity is referenceable. In this manner, the protocol entity may be accessed rapidly and directly for later reconfigurations and to release the protocol entity.

The protocol entity ID may be specified so that it corresponds to the ID of the carrier assigned to it. In this manner, the transmission of an additional information element for identifying the protocol entity may be eliminated, and therefore transmission bandwidth may be saved.

A communication may be transmitted from the first wireless station to the second wireless station, before receipt of the configuration request, indicating which settings of the at least one protocol entity are supported by the first wireless station. In this manner, it may be ensured that the second wireless station, using the configuration request, only specifies to the first wireless station, in a specified or selectable manner, those settings for the configuration of the at least one protocol entity which are also implementable in the first wireless station.

The communication may be transmitted to the second wireless station together with a message about the capabilities and the output range of the first wireless station. In this manner, an additional information element for the transmission of the communication may be eliminated, and therefore transmission bandwidth may be saved.

The configuration request, in the case in which a carrier is established, reconfigured, or cleared using a carrier configuration message, may be inserted into the carrier configuration message. In this manner, an additional information element for the transmission of the configuration request may be eliminated, and therefore transmission bandwidth may be saved.

The confirmation signal may be inserted into a message issued by the first wireless station to acknowledge the establishment or the reconfiguration of the carrier. In this manner, an additional information element for the transmission of the confirmation signal may be eliminated, and therefore transmission bandwidth may be saved.

DETAILED DESCRIPTION

Figure 1:
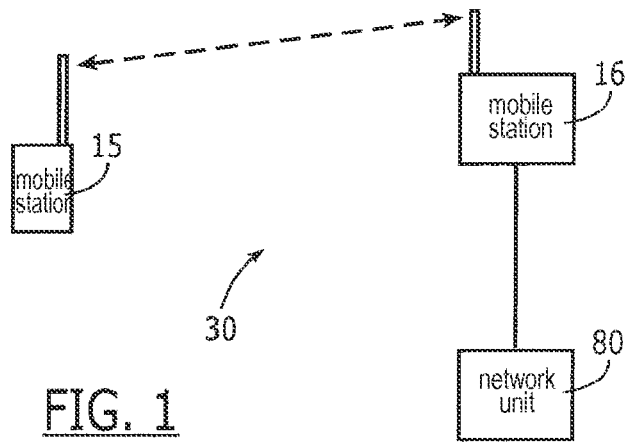
FIG. 1 shows a mobile wireless network having two wireless stations.

In FIG. 1, 30 identifies a mobile wireless network in which a first wireless station 15 and a second wireless station 16 are located. Second wireless station 16 is connected in this case to a network unit 80, which offers services for subscribers in mobile wireless network 30 and operates mobile wireless network 30. First wireless station 15 is, in this example, a subscriber of mobile wireless network 30, for example in the form of a mobile telecommunication terminal or a mobile station, particularly in the form of a mobile telephone. In the following, first wireless station 15 is to be implemented as a mobile station. Second wireless station 16 is, in this example, a base station of mobile wireless network 30. However, it may not be relevant for the present invention whether first wireless station 15 and/or second wireless station 16 is a subscriber or a base station of the mobile wireless network. In this case, mobile wireless network 30 may have further base stations and subscribers, which are not, however, illustrated in FIG. 1.

Mobile wireless network 30 may, for example, be operated according to a GSM standard (Global System for Mobile Communications) or according to a UMTS standard (Universal Mobile Telecommunications System) or the like.

Figure 2:
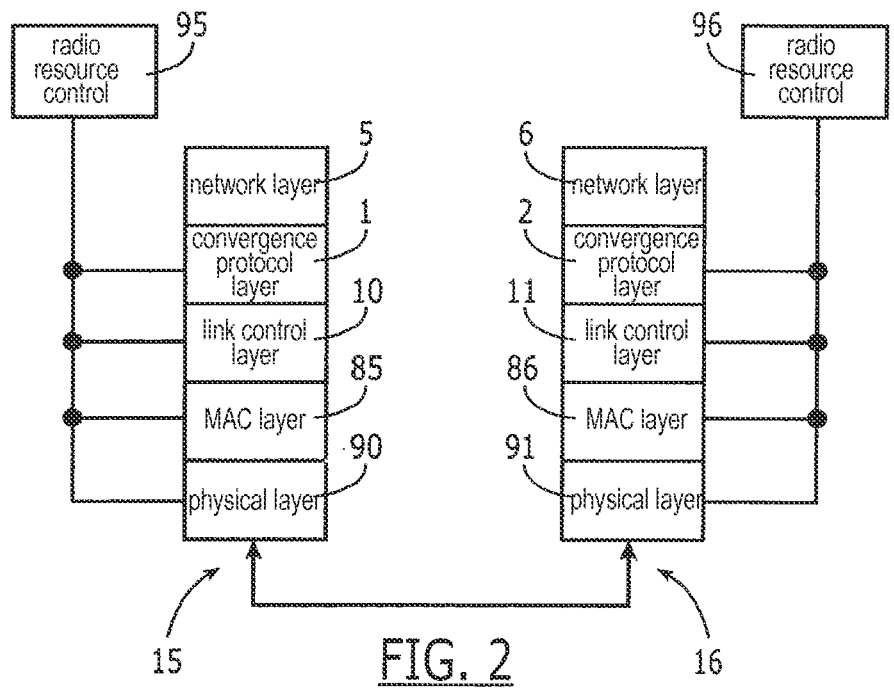
FIG. 2 shows a protocol layer sequence for the two wireless stations.

The present invention relates to a packet data convergence protocol for mobile wireless networks. The present invention suggests functionalities within a convergence protocol layer 1, 2 as shown in FIG. 2, which may be used in, for example, a mobile wireless system according to the UMTS standard (Universal Mobile Telecommunications System) or also in a mobile wireless system according to the GSM standard. In the following, it may be assumed for exemplary purposes that mobile wireless network 30 is operated according to the UMTS standard.

The convergence protocol used according to the UMTS standard is referred to in this case as PDCP (Packet Data Convergence Protocol).

The functionalities of the UMTS mobile wireless system may be divided into layers, as may also be the case in the GSM mobile wireless system shown in FIG. 2. Various protocols may be specified within the layers which may make various services available to each of the higher layers and which may make use of the services offered by lower-lying layers. Each protocol exists in this case at least two times within the mobile wireless system, namely in at least two units, with the units each lying in the same layer. In this case, mobile station 15 represents a first of the two units. Base station 16 represents a second of the two units. The layer hierarchy described is classified into a user level and a control level in this case. The user level may also be referred to as a user plane and the control level may also be referred to as a control plane. Protocols in which user data is transported are assigned to the user level in this case. Protocols in which control data is transported and partially generated are assigned to the control level. The layer or protocol hierarchy of the user level may be relevant for this present invention since the convergence protocol layer lies in the user level and provides services for user data transport. User data which is generated by applications and packets and is to be transmitted in a packet-oriented manner is initially transferred from the appropriate application to a transport layer protocol in a transport layer. The TCP (Transmission Control Protocol) and the UDP (User Datagram Protocol) may be conventional in this regard. However, other transport layer protocols or a transparent transport layer may also be possible, through which the user data to be transmitted is relayed transparently without using a transport layer protocol. Transport layer protocols may be used for the purpose of securing the packet data for transport through mobile wireless network 30, which is used in this case as a packet data network, and for attaching the desired routing information to it. The transport layer may use services of a network protocol in a network layer lying underneath the transport layer. The network layer is illustrated in FIG. 2 and is identified using the reference number 5 for mobile station 15 and using the reference number 6 for base station 16. The network protocols are, as described, referred to as PDP (Packet Data Protocol). The transport layer uses the services of the PDPs in order to transmit the user data. Example PDPs of network layer 5, 6 may include IP (Internet Protocol) and the X.25 protocol. Both the network and the transport protocols may attach control data to the user data, for example in the form of a TCP/IP header. The UMTS-specific protocols may lie underneath network layer 5, 6. Data about the data link used by the PDP is stored using each PDP in mobile wireless network 30 and in a terminal of the mobile wireless network which communicates with mobile wireless network 30, for example in mobile station 15. This data may, for example, contain parameters about quality of service QOS and is referred to as PDP context. It may be possible to operate a PDP simultaneously using different contexts, with the contexts only differing in the parameters for quality of service QOS. Therefore, in a terminal, an IP protocol having an IP address may be operated once using a first parameter for quality of service QOS and once using a second parameter for quality of service QOS. PDP contexts may, however, also be based on different network protocols. Thus, for example, three different network protocols may run in one terminal: two IP protocols having different IP addresses and one X.25 protocol.

Figure 3:
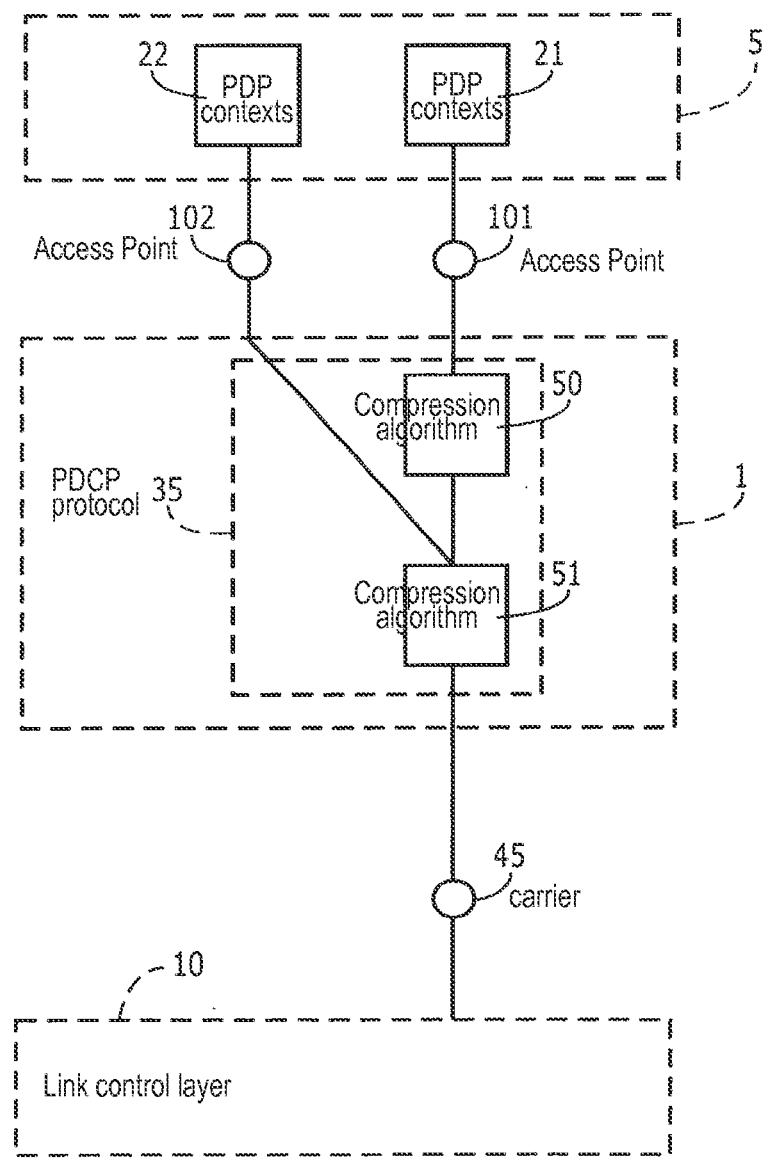
FIG. 3 shows a detail from the protocol layer sequence of a first of the two wireless stations.

Each of these PDP contexts is illustrated as an independent block in network layer 5, 6 above convergence protocol layer 1, 2 and is indicated in FIG. 3 for mobile station 15 using reference numbers 21 and 22. In this case, PDP contexts 21, 22 represent users of convergence protocol layer 1, 2 shown in FIG. 3 lying underneath network layer 5, 6. In FIG. 2, the convergence protocol layer for mobile station 15 is indicated using reference number 1 and the convergence protocol layer for base station 16 is indicated using reference number 2.

The PDCP, whose task is to prepare the data to be transmitted between mobile station 15 and base station 16 for efficient UMTS transmission, tailors the user data which comes from a PDP context for transmission via an air interface, in that it optionally compresses the user data and/or the control data or protocol control information added to the user data and combines or multiplexes possible packet data streams from different PDP contexts 21, 22, which require the same transmission quality, into one packet data stream.

In the layer model of the UMTS mobile wireless system, an RLC link control layer (Radio Link Control) is located underneath convergence protocol layer 1, 2 provided for forming the PDCP, which is indicated for mobile station 15 using reference number 10 and for base station 16 using reference number 11 in FIG. 2 and which optionally corrects transmission errors of the air interface, in that it requests any faulty packets to be resent on the receiver end and resends them on the transmitter end. Furthermore, RLC link control layer 10, 11 optionally ensures that the sequence of the data packets is maintained during transmission and segments the data packets into RLC-PDUs (RLC Packet Data Units), whose length is tailored to the transmission channels used.

A data carrier, which may also be referred to as a radio bearer or RB, and which provides RLC link control layer 10, 11 lying underneath convergence protocol layer 1, 2, is then used for the transmission of any of the multiplexed packet data streams from various PDP contexts 21, 22.

Convergence protocol layer 1, 2 has PDCP protocol entities 35 as shown in FIG. 3, each of which may contain multiple compression algorithms 50, 51. Multiple PDP contexts 21, 22 may be connected to one PDCP protocol entity 35;

however, one PDP context 21, 22 may only be connected to one PDCP protocol entity 35. Each PDCP protocol entity 35 uses one carrier 45, which may also be referred to as a radio bearer. A radio bearer is the link between a PDCP protocol entity 35 and an entity of underlying RLC link control layer 10, 11, via which the data is relayed from convergence protocol layer 1, 2 to RLC link control layer 10, 11. Conventional compression algorithms, such as those described in the publication RFC 1144 "Compressing TCP/IP Headers for Low Speed Serial Links" for TCP/IP protocols (TCP=Transmission Control Protocol; IP=Internet Protocol) and in the publication RFC 2507 "IP Header Compression" for UDP/IP protocols (UDP=User Datagram Protocol), are based on the establishment and use of codebooks, in which codes are stored in the form of tables, with which the user data and/or protocol control information to be transmitted is coded and/or compressed in corresponding PDCP protocol entity 35 of the transmitting wireless station and to which reference is made in the user data and/or protocol control information compressed in this manner. The codebooks used must also be available in the decompressor of the receiving wireless station in order to allow decoding.

In order to ensure proper functioning of PDCP protocol entities 35, compression algorithms 50, 51, their compression parameters, such as the number of codes to be stored in the compressor and decompressor in corresponding codebooks, and the multiplexing information of both convergence protocol layers 1, 2 in mobile station 15 and in base station 16 may need to be identical. In this case, the multiplexing information indicates which PDP contexts 21, 22 supply their packet data streams to corresponding PDCP protocol entity 35 for multiplexing. Compression algorithms 50, 51, the compression parameters, and the multiplexing information represent PDCP protocol entity parameters, which may also include further parameters, such as information about carrier 45 to be used by corresponding PDCP protocol entity 35. Before setup of a new PDCP protocol entity 35, a handshake procedure of both wireless stations 15, 16 about the PDCP protocol entity parameters to be configured is performed. This handshake procedure is performed in the control level by an RRC (Radio Resource Control), with radio resource control RRC being identified in FIG. 2 for mobile station 15 using reference number 95 and for base station 16 using reference number 96.

RLC link control layer 10, 11 uses the services of the underlying MAC layer (Medium Access Control) in order to transmit the RLC-PDUs. The MAC layer is indicated in FIG. 2 for mobile station 15 by reference number 85 and for base station 16 by reference number 86 and ensures the access to the actual transmission medium, selects suitable transport formats, and multiplexes the various RLC-PDUs onto suitable transport channels, which are mapped onto the assigned physical channels in the underlying physical layer, which is indicated in FIG. 2 for mobile station 15 by reference number 90 and for base station 16 by reference number 91. The layer hierarchy or protocol hierarchy is described in the publication "Radio Interface Protocol Architecture", 3 GPP TS 25.301. Some of the layers described, i.e., physical layer 90, 91, MAC layer 85, 86, RLC link control layer 10, 11, and convergence protocol layer 1, 2, also have a direct link to radio resource control RRC. This link is used to transmit status information to radio resource control RRC 95, 96 and to allow radio resource control RRC 95, 96 to configure the other protocols.

Data to be transmitted between mobile station 15 and base station 16 runs from top to bottom through the layer sequence described. Data received runs from bottom to top through the layer sequence described.

A protocol for controlling radio resource control RRC 95, 96 is described in the publication "RRC Protocol Specification", 3 GPP TSG RAN WG2, TS 25.331 v1.4.2 and is referred to in the following as RRC protocol. The objects of this RRC protocol may include, among other things, the configuration of the individual layers, negotiation of parameters for the configuration of the layers with the peer RRC layer, and establishment and release of connections between mobile station 15 and mobile wireless network 30 and/or, acting as mobile wireless network 30 in this example embodiment, to base station 16. The peer RRC layer represents, in this case, a layer of radio resource control RRC 95, 96 on the same protocol layer level as the layer of mobile station 15 and/or base station 16 to be configured. The parameters for configuring the individual layers are exchanged in messages between the peer RRC layers of mobile station 15 and base station 16 in regard to the respective layer to be configured.

The signaling described in the publication "RRC Protocol Specification" cited may not include the negotiation of the PDCP protocol entity parameters, i.e., neither the negotiation of compression algorithms 51, 52 and their compression algorithms for PDCP protocol entities 35, for example, nor the configuration of the multiplexing of the packet data streams of multiple PDP contexts 21, 22 in convergence protocol layer 1, 2.

In FIG. 3, a detail from the layer sequence for mobile station 15 is illustrated as an example.

In FIG. 3, network layer 5, convergence protocol layer 1, and link control layer 10 of mobile station 15 are illustrated. In this case, as shown in FIG. 3, each PDP context 21, 22 uses the services of convergence protocol layer 1 at a respective access point 101, 102 assigned to it, which may also be referred to as a network layer service access point (NSAP). Each of these access points 101, 102 is assigned an identifier, for example an NSAPI (Network Layer Service Access Point Identifier), which uniquely identifies assigned PDP context 21, 22. Currently, for GSM a maximum of 16 NSAPs may be simultaneously provided in a mobile station 15. For UMTS, the number of PDP contexts which may simultaneously exist in a mobile station may not have yet been specified. The links of link control layer 10 are used by convergence protocol layer 1 via service access points, which are may also be referred to as SAP (service access point). An identifier RB identity (radio bearer identity) is assigned to each of the individual connections to the SAPs in order to identify the individual connections between convergence protocol layer 5 and link control layer 10. In this case, each service access point offers a specific quality of service or transmission QOS and, in the GSM mobile wireless system, a maximum of four different service access points, and therefore four different links in link control layer 10 having different quality of transmission QOS, may be provided. In the UMTS mobile wireless system, for example, three different service access points, each having different links in link control layer 10 with different qualities of transmission QOS, may be provided, without being restricted to this example. In order to allow convergence protocol layer 1 to be able to relay data packets arriving or received at one of the service access points to the correct receiver and/or to the correct PDP context after decompression of the user data and/or the protocol control information, the data packets may have an identifier of the receiving PDP context, i.e., the receiving user of convergence protocol layer 1, attached by the transmitter.

The NSAPI may be used as an identifier for this purpose, which may be, for example, attached to each data packet on the transmitter end as a 4-bit value.

The links to the service access points described are each implemented by a carrier which is, as described, also referred to as a radio bearer. A radio bearer is, as described, the link between a PDCP protocol entity 35 and an entity of underlying RLC link control layer 10, 11, via which the data from convergence protocol layer 1, 2 is relayed to RLC link control layer 10, 11. In FIG. 3, carrier 45 is illustrated acting as the service access points, which, acting as the PDCP protocol entities located in convergence protocol layer 1, connects PDCP protocol entity 35 to an entity of RLC link control layer 10, not illustrated in FIG. 3.

PDCP protocol entity 35 of convergence protocol layer 1 described for exemplary purposes includes, in this case, as shown in FIG. 3, a data compression algorithm 51 which compresses the user data received from network layer 5. A data decompression algorithm, not shown in FIG. 3, is associated with data compression algorithm 51. The data decompression algorithm decompresses user data received from link control layer 10 and therefore ultimately from base station 16. At the same time, it reverses a data compression in accordance with assigned data compression algorithm 51. PDCP protocol entity 35 of convergence protocol layer 1 further includes a protocol control information compression algorithm 50, which is also referred to in the following as first compression algorithm 50 and which compresses the protocol control information received from network layer 5 with the user data and/or generated in convergence protocol layer 1 for the user data received. A protocol control information decompression algorithm, not shown in FIG. 3, which decompresses the protocol control information received from link control layer 10 and thus reverses a compression according to assigned protocol control information compression algorithm 50, is associated in a corresponding way with protocol control information compression algorithm 50.

A first PDP context 21 is connected, via a first access point 101 assigned to it, to protocol control information compression algorithm 50 and an associated protocol control information decompression algorithm. In the following, the compression and decompression algorithms associated with one another are viewed as a unit to simplify the description and are referenced by the corresponding compression algorithm as a substitute. Thus, protocol control information compression algorithm 50 is connected via data compression algorithm 51, which is also referred to in the following as second compression algorithm 51, to carrier 45.

A second PDP context 22 is directly connected, via an access point 102 assigned to it, to data compression algorithm 51, which is connected to carrier 45, as described. The remaining PDP contexts of network layer 5 are not shown in FIG. 3 for reasons of clarity, nor are further PDCP protocol entities of convergence protocol layer 1 and further carriers.

The present invention may include procedures which allow the negotiation of PDCP protocol entity parameters and the establishment of PDCP protocol entities between two devices of mobile wireless network 30, in this example between mobile station 15 and base station 16, which cooperate with network unit 80, for example a radio network controller (RNC), and may therefore be understood as acting as a network entity.

Figure 4:
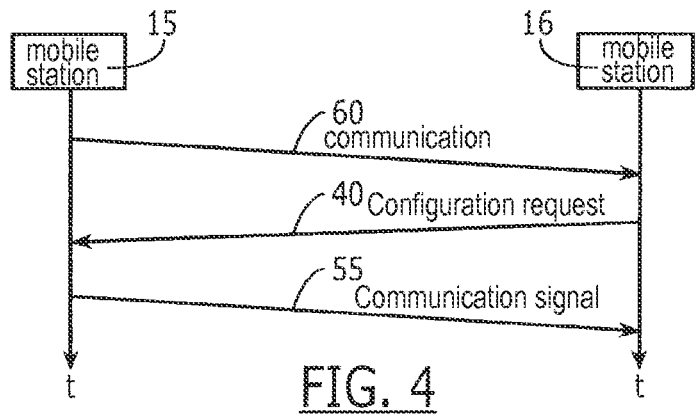
FIG. 4 shows a first variation over time of a signaling exchange between the two wireless stations.

In this case, a procedure in which base station 16 receives a communication 60, shown in FIG. 4, from mobile station 15 about the settings supported by mobile station 15 of PDCP protocol entity 35 to be configured of mobile station 15 is at the beginning of the negotiations. In this example, the configuring of PDCP protocol entity 35 illustrated in FIG. 3 is described as an example. Multiple PDCP protocol entities of mobile station 15 may, of course, be configured simultaneously in a corresponding manner.

Directly before the initial setup of PDCP protocol entity 35, base station 16, shown in FIG. 4, sends a first configuration request 40 to mobile station 15, in which the initial setup of PDCP protocol entity 35 is initiated. The PDCP protocol entity parameters which base station 16 has selected taking into consideration the settings supported by mobile station 15 of PDCP protocol entity 35 to be configured are contained in this first configuration request 40. First configuration request 40 may also be referred to as the PDCP Establishment Request.

Mobile station 15 may now establish PDCP protocol entity 35 using the PDCP protocol entity parameters received in first configuration request 40 from base station 16. After this establishment, mobile station 15 acknowledges the establishment and therefore signals to base station 16, using a first confirmation signal 55, that PDCP protocol entity 35 is ready to receive and/or transmit data. This first confirmation signal 55 may also be referred to as the PDCP Establishment Confirm.

It is alternatively or additionally possible that first configuration request 40 includes a selection of settings and/or PDCP protocol entity parameters supported by base station 16 for forming PDCP protocol entity 35, so that mobile station 15 may also, after receiving first configuration request 40, select on its part the PDCP protocol entity parameters from the predetermined selection in order to adjust PDCP protocol entity 35 as optimally as possible to the capabilities and the output range, and possibly also to user presets. Using first confirmation signal 55, which mobile station 15 then sends to base station 16, the PDCP protocol entity parameters selected by mobile station 15 are communicated to base station 16.

If the establishment of PDCP protocol entity 35 fails, a corresponding message about the failure of the establishment may be transmitted from mobile station 15 to base station 16 instead of first confirmation signal 55. This message may be referred to as a "PDCP Establishment Failure" message.

Communication 60 contains, for example, information about compression algorithms 50, 51 supported by mobile station 15, their compression parameters used, and the multiplexing methods which are possible in mobile station 15, i.e., the maximum number of PDP contexts 21, 22 and the possible number of carriers used by convergence protocol layer 1 of mobile station 15.

First configuration request 40 contains information about which PDP contexts 21, 22 access PDCP protocol entity 35 to be set up and which carrier is to be used by this PDCP protocol entity 35. Furthermore, either first configuration request 40 contains specified presets about compression algorithm(s) 50, 51 to be used and the compression parameters to be used for this purpose or first configuration request 40 contains a selection of possible compression algorithms 50, 51 and/or a selection of compression parameters, from which mobile station 15 may select one or more suitable compression algorithms 50, 51 and their compression parameters.

First confirmation signal 55 then contains either only the information that corresponding PDCP protocol entity 35 was established or additional information about compression algorithm(s) 50, 51 selected and its/their compression parameters.

If the establishment of PDCP protocol entity 35 fails, a "PDCP Establishment Failure" message, which may contain information about the reason for the failed establishment, is transmitted by mobile station 15 to base station 16 instead of first confirmation signal 55.

First configuration request 40 and first confirmation signal 55 additionally contain a PDCP protocol entity ID, with which PDCP protocol entity 35 may later be referenced in order to release or reconfigure it. The function of the PDCP protocol entity ID may also be assumed by the ID for carrier 45, as described in the publication "RRC Protocol Specification" cited, which may also be referred to as "RB identity," since a PDCP protocol entity may be assigned to one and only one carrier.

After PDCP protocol entity 35 is established, it may be possible to reconfigure it. For this purpose, base station 16 sends a second configuration request 41 shown in FIG. 5, which indicates how PDCP protocol entity 35 is to be reconfigured, to mobile station 15. Second configuration request 41 may also be referred to as a "PDCP reconfigure request" message. This second configuration request 41 may be used for various purposes and correspondingly may contain various items of information, but the ID of the PDCP protocol entity/entities to be reconfigured is contained in second configuration request 41.

In order to modify the multiplexing function of established PDCP protocol entity 35 described in this example, it may be advisable to attach information about one or more new PDP contexts, whose packet data streams are to be multiplexed onto carrier 45 used by PDCP protocol entity 35, in convergence protocol layer 1 of mobile station 15 to second configuration request 41, in addition to the packet data streams of already present PDP contexts 21, 22.

If one or more existing PDP contexts 21, 22 are to use a carrier having other properties, for example having another quality of transmission QOS, it may be advisable to attach information about the PDP context(s) to second configuration request 41, whose packet data streams are to be multiplexed onto a carrier having the desired properties in convergence protocol layer 1 of mobile station 15 by existing PDCP protocol entity 35.

If PDCP protocol entity 35 is to use one or more other or additional compression algorithms for compressing the user data or the protocol control information, it may be advisable to attach information about this or these new compression algorithm(s) to second configuration request 41.

Figure 5:
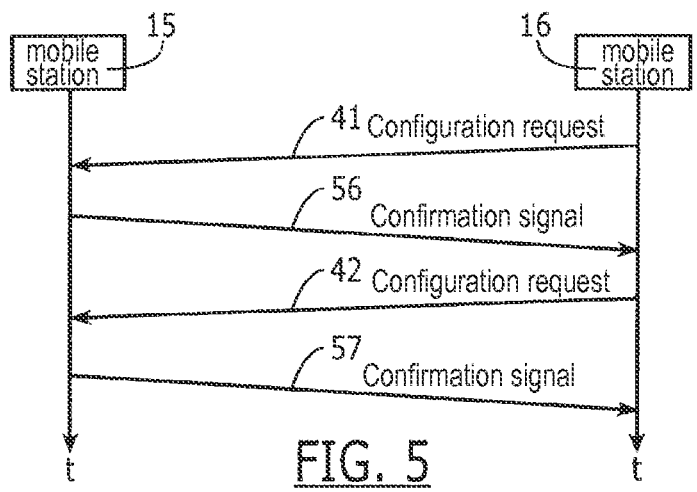
FIG. 5 shows a second variation over time of a signaling exchange between the two wireless stations.

Second configuration request 41 may be acknowledged by mobile station 15 by a second confirmation signal 56 shown in FIG. 5, which may also be referred to as a "PDCP Reconfigure Confirm" message, in order to communicate the successful change of the configuration to base station 16.

If mobile station 15 is given the possibility, after receipt of second configuration request 41, as also described for first configuration request 40, of selecting on its part the PDCP protocol entity parameters from a selection made available by base station 16, in this manner the PDCP protocol entity parameters appropriately selected and set by mobile station 15 may be contained in second confirmation signal 56 in a manner corresponding to that described for confirmation signal 55.

If the reconfiguration of PDCP protocol entity 35 fails, then in this manner, as described, a corresponding message about the failure, which may also be referred to as a "PDCP Reconfiguration Failure" message, may be transmitted back from mobile station 15 to base station 16 instead of second confirmation signal 56. The reason for the failure may be contained in this message.

Established PDCP protocol entity 35 may also be released again. This procedure may also be understood as a configuration in this example embodiment, like the establishment and the reconfiguration of PDCP protocol entity 35. For this purpose, base station 16 shown in FIG. 5 sends a third configuration request 42 to mobile station 15, which contains the PDCP protocol entity identification and after whose receipt mobile station 15 releases PDCP protocol entity 35. Third configuration request 42 may also be referred to as a PDCP Release Request.

Third configuration request 42 may be acknowledged by mobile station 15 by a third confirmation signal 57, which may also be referred to as a "PDCP Release Confirm" message, in order to communicate the successful release of PDCP protocol entity 35 to base station 16.

If the release of PDCP protocol entity 35 fails, then instead of third confirmation signal 57, a message about the failure of the release may be transmitted back from mobile station 15 to base station 16, which may also be referred to as a "PDCP Release Failure" message and which may possibly also contain information about the reason for the failure.

The procedures described here may, for example, all be implemented as described by a protocol for controlling the wireless resources, which may also be referred to as an RRC protocol. The RRC protocol may already be partially specified in the UMTS standard in accordance with the publication "RRC Protocol Specification" cited already which may contain procedures for establishing and releasing and for reconfiguring carriers or RBs. In these procedures, messages are sent from base station 16 to mobile station 15 and vice-versa.

In the case in which PDCP protocol entity 35, described here as an example, is established, released, or reconfigured at the same instant as assigned carrier 45, it may be advisable to integrate communications 60, configuration requests 40, 41, 42, confirmation signals 55, 56, 57, and messages about the failure of the respective configuration of PDCP protocol entity 35 described above into the RRC messages already defined in accordance with the publication "RRC Protocol Specification" cited. This may be accomplished as follows:

First configuration request 40 for establishing PDCP protocol entity 35 is inserted into the "Radio Bearer Setup" message described from the publication "RRC Protocol Specification" cited. Using this "Radio Bearer Setup" message, a new carrier, in this example carrier 45 shown in FIG. 3, is established. Since one and only one PDCP protocol entity may be assigned to each carrier and one PDCP protocol entity 35 is also only connected to one carrier, PDCP protocol entity 35 is established using carrier 45. Therefore, the PDCP protocol entity parameters for this PDCP protocol entity 35 may additionally be contained in the "Radio Bearer Setup" message.

The establishment of new carrier 45 is confirmed by mobile station 15 using the "Radio Bearer Setup Complete" message in accordance with the publication "RRC Protocol Specification" cited. This "Radio Bearer Setup Complete" message may also assume the function of first confirmation signal 55 described above. If mobile station 15 is, as described, given the possibility, after receipt of first configuration request 40, of selecting on its part the PDCP protocol entity parameters and of correspondingly setting and/or configure PDCP protocol entity 35, the information about the PDCP protocol entity parameters selected In this manner may be attached to the "Radio Bearer Setup Complete" message.

If the establishment of new carrier 45 fails, mobile station 15 transmits, in accordance with the publication "RRC Protocol Specification" cited, a "Radio Bearer Setup Failure" message to base station 16. If the establishment fails due to a PDCP protocol entity 35 which is unable to be created, e.g., due to PDCP protocol entity parameters not supported by base station 16 or mobile station 15, corresponding information about the reason for the failure of the establishment of PDCP protocol entity 35 may be attached to the "Radio Bearer Setup Failure" message.

To reconfigure carrier 45 described in this example, in accordance with the publication "RRC Protocol Specification" cited, the "Radio Bearer Reconfiguration" message is transmitted from base station 16 to mobile station 15. Information corresponding to second configuration request 41 described above may be attached to this message, in order to also modify the PDCP protocol entity parameters of corresponding PDCP protocol entity 35.

In order to confirm the changes in carrier 45 performed during the reconfiguration, mobile station 15 transmits the "Radio Bearer Reconfiguration Complete" message described in the publication "RRC Protocol Specification" cited as an answer-back to base station 16. If mobile station 15 is given the possibility, after receipt of second configuration request 41, of selecting and setting the PDCP protocol entity parameters in the manner described on its part, so that PDCP protocol entity 35 is modified, i.e., reconfigured, the information about the PDCP protocol entity parameters selected may be attached to the "Radio Bearer Reconfiguration Complete" message.

If the changes and/or the reconfiguration of carrier 45 fails, mobile station 15 transmits the "Radio Bearer Reconfiguration Failure" message back to base station 16 in accordance with the publication "RRC Protocol Specification" cited. If the error is attributed to a modification of the PDCP protocol entity parameters which is unable to be performed, for example because it is not supported by base station 16 or mobile station 15, the reason for this may also be added to the "Radio Bearer Reconfiguration Failure" message.

For the cases mentioned, the already existing "RB entity" may be used as the identification for PDCP protocol entity 35 as described, in order to thus dispense with an additional information element.

The cases mentioned here for configuring PDCP protocol entity 35 by establishing, reconfiguring, and releasing PDCP protocol entity 35 are initiated in the example embodiment described here by base station 16, but they may also be initiated by mobile station 15.

In the following, the message exchange described between mobile station 15 and base station 16 is described in more concrete form. In this case, mobile station 15 includes a digital computer and a mobile wireless unit, via which the digital computer may transmit and/or receive data to and/or from mobile wireless network 30. This data may, for example, be relayed to and/or from the Internet, which is connected in this example embodiment to mobile wireless network 30.

Figure 6:
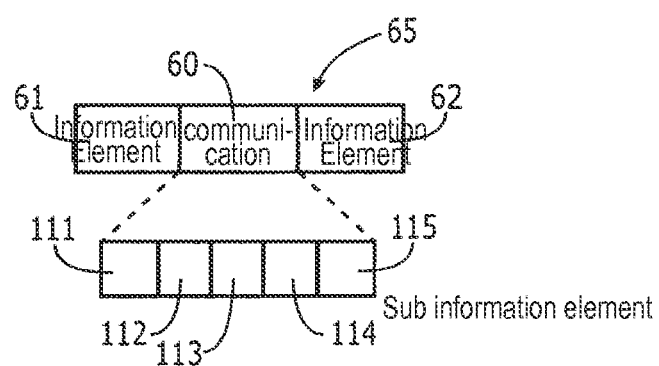
FIG. 6 shows a message element for communicating the capabilities or the output range of the first wireless station.

Mobile station 15 announces itself after mobile wireless network 30 is switched on and sends, at a suitable instant, a "UE Capability Information" message 65 (UE=User Equipment), shown in FIG. 6 and provided in accordance with the UMTS standard, to mobile wireless network 30, in which it announces its capabilities and its output range to the mobile wireless network. This "UE Capability Information" message 65 is expanded according to the present invention using a "PDCP capability" information element, which corresponds to communication 60 described. "UE Capability Information" message 65 having "PDCP capability" information element 60 is shown in FIG. 6. In addition, in FIG. 6, 61 and 62 each indicate an information element of "UE Capability Information" message 65, which represents the capabilities of mobile station 15 in regard to functions which are independent of PDCP protocol entity 35.

"PDCP capability" information element 60 contains information about the multiplexing and compression capabilities of mobile station 15. In FIG. 6, 111 indicates a first sub-information element, which is contained in "PDCP capability" information element 60 and, for example, occupies one bit which indicates whether mobile station 15 supports multiplexing or occupies multiple bits which indicate how many packet data streams of different PDP contexts may be multiplexed at maximum onto one carrier. In FIG. 6, 112 indicates a second sub-information element, which is contained in "PDCP capability" information element 60 and correspondingly indicates whether mobile station 15 supports first compression algorithm 50. In FIG. 6, 113 indicates a third sub-information element which is contained in "PDCP capability" information element 60 and correspondingly indicates whether mobile station 15 supports second compression algorithm 51. In FIG. 6, 114 indicates a fourth sub-information element which is contained in "PDCP capability" information element 60 and correspondingly indicates compression parameters for first compression algorithm 50 supported by mobile station 15. In FIG. 6, 115 indicates a fifth sub-information element which is contained in "PDCP capability" information element 60 and correspondingly indicates compression parameters for second compression algorithm 51 supported by mobile station 15. In this case, fourth information element 114 and fifth information element 115 represent, for example, the maximum length of the codebooks associated with respective compression algorithm 50, 51, i.e., the maximum number of entries of these codebooks.

Through the transmission of "UE Capability Information" message 65 from mobile station 15 to base station 16, network unit 80 of mobile wireless network 30 receives information via base station 16 about which compression algorithms are supported by mobile station 15. Network unit 80 acknowledges the receipt of "UE Capability Information" message 65 via base station 16 using a "Capability Information Confirm" message, which is sent to mobile station 15 from base station 16.

On the basis of PDCP protocol entity 35 described in accordance with FIG. 3, it may now be assumed that mobile station 15 supports both first compression algorithm 50 and second compression algorithm 51. As described, second compression algorithm 51 may be, in this case, suitable for the purpose of compressing user data which is to be assembled using the transport layer protocols and the network protocols. Furthermore, in accordance with PDCP protocol entity 35 described in FIG. 3, it may be assumed that mobile station 15 also supports the multiplexing of packet data streams of various PDP contexts 21, 22.

Figure 7:
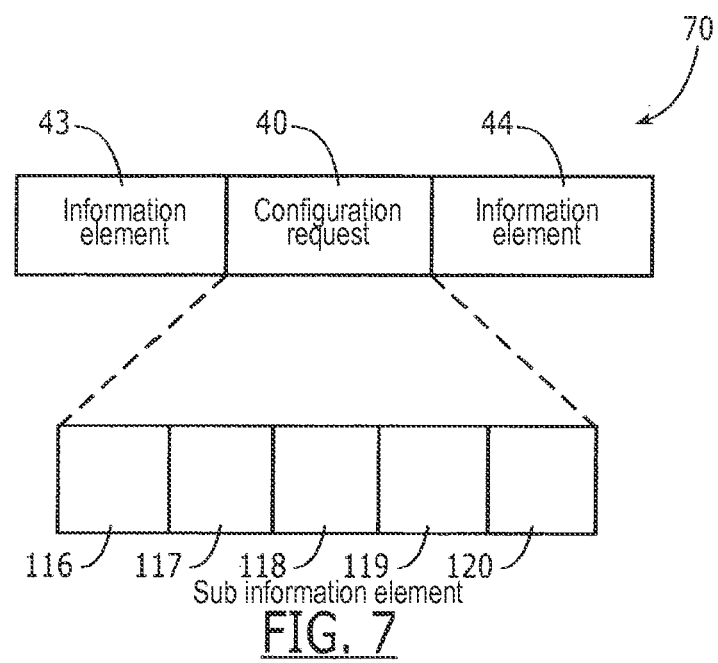
FIG. 7 shows a carrier configuration message.

If packet data is now to be transmitted from base station 16 of mobile wireless network 30 to mobile station 15, then for this purpose a connection is established via the UMTS air interface, i.e., carrier 45 and/or a radio bearer RB. For this purpose, base station 16 transmits the "Radio Bearer Setup" message as a carrier configuration message 70 shown in FIG. 7 as described to mobile station 15, with several parameters for the establishment of carrier 45 being contained in carrier configuration message 70. According to the present invention, this carrier configuration message 70 is, as shown in FIG. 7, expanded by a "PDCP Info" information element, which corresponds to first configuration request 40 and contains information about how new PDCP protocol entity 35 which is to be established is to be configured. In FIG. 7, 43 and 44 indicate other information elements which are independent of the configuration of PDCP protocol entity 35. In FIG. 7, 116 indicates a sixth sub-information element which is contained in "PDCP Info" information element 40 and, for example, occupies four bits, which indicate how many different PDP contexts packet data streams are to be multiplexed onto newly established carrier 45. If this number is equal to one, no multiplexing is used. In FIG. 7, 117 indicates a seventh sub-information element which is contained in "PDCP Info" information element 40 and which contains a list which includes the identifiers for the addressing of PDP contexts corresponding to the number indicated in sixth sub-information element 116. In FIG. 7, 118 indicates a eighth sub-information element which is contained in "PDCP Info" information element 40 and which contains the number of compression algorithms to be used in PDCP protocol entity 35 to be configured. In FIG. 7, 119 indicates a ninth sub-information element which is contained in "PDCP Info" information element 40 and contains a list of these compression algorithms. In FIG. 7, 120 indicates a tenth sub-information element which is contained in "PDCP Info" information element 40 and provides either one compression parameter at a time or a list of compression parameters for the compression algorithms indicated in ninth sub-information element 119.

In an example embodiment for "PDCP Info" information element 40, the values contained in the associated sub-information elements may be selected as follows:
sixth sub-information element 116=>1
seventh sub-information element 117=>22
eighth sub-information element 118=>1
ninth sub-information element 119=>51
tenth sub-information element 120=>16.

This means that a PDP context having the identifier 22 uses PDCP protocol entity 35 for multiplexing its packet data streams onto carrier 45, using a compression algorithm having number 51 and codebook length 16 in PDCP protocol entity 35. This corresponds to a configuration of PDCP protocol entity 35 shown in FIG. 3, in which only second PDP context 22 is connected, via second access point 102, second compression algorithm 51, and carrier 55, to RLC link control layer 10 of mobile station 15, with multiplexing not being required per se, since only the packet data stream of second PDP context 22 is transmitted via carrier 45 to RLC link control layer 10 of mobile station 15. First PDP context 21 would, in this configuration, not access PDP protocol entity 35, in contrast to the example described according to FIG. 3.

Figure 8:
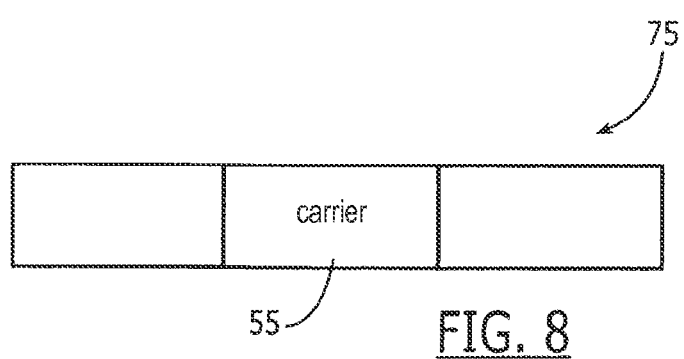
FIG. 8 shows an acknowledgment message.

If the RRC protocol in mobile station 15 receives carrier configuration message 70 and the PDCP protocol entity parameters contained therein correspond to the capabilities of mobile station 15, radio resource control 95 of mobile station 15 will, in addition to carrier 45, also create PDCP protocol entity 35 and configure the PDCP protocol entity parameters correspondingly. Subsequently, the RRC protocol confirms the establishment of carrier 45 and PDCP protocol entity 35 using a "Radio Bearer Setup Complete" message, which represents an acknowledgment message 75 and contains first confirmation signal 55 shown in FIG. 8. Therefore, data transfer is possible via new carrier 45 and via new PDCP protocol entity 35. If the establishment of carrier 45 and/or PDCP protocol entity 35 is not possible for any reason, then a "Radio Bearer Setup Failure" message is transmitted from mobile station 15 to base station 16, which may contain information about the reason for the failed establishment.

PDCP protocol entity 35 which is set up in this manner and uses carrier 45 which is also set up, may be more appropriately reconfigured in two instances.

In the first case, i.e., if carrier 45 used by PDCP protocol entity 35 is also to be reconfigured, it may be advisable to combine both reconfigurations. A "PDCP Reconfiguration Info" information element, which appears similar or identical to "PDCP Info" information element 40 described above and corresponds to second configuration request 41, is inserted in this case into a "Radio Bearer Reconfiguration" message which already exists and is to be transmitted from base station 16 to mobile station 15. In this manner, the compression algorithms used by PDCP protocol entity 35, their compression parameters, and the list of PDP contexts accessing PDCP protocol entity 35 may be modified and/or reconfigured. The "Radio Bearer Reconfiguration Complete" message subsequently sent using RRC protocol from mobile station 15 to base station 16 then also confirms the reconfiguration of PDCP protocol entity 35 using the reconfiguration of carrier 45.

In the second case, i.e., if carrier 45 used by PDCP protocol entity 35 does not have to be reconfigured, it may be advisable to transmit its own "PDCP Reconfiguration" message used for convergence protocol layer 1 of mobile station 15 from base station 16 to mobile station 15, for example in the form of the "PDCP reconfigure request" message described, which, in addition to second configuration request 41, which contains the reconfiguration information, also includes the PDCP protocol entity ID of PDCP protocol entity 35 or the ID of carrier 45 assigned to it.

The release of PDCP protocol entity 35 may expediently occur automatically using the release of carrier 45 assigned to it through a "Radio Bearer Release" message.

The configuration of PDCP protocol entity 35 of mobile station 15 using the compression algorithms, compression parameters, and multiplexing properties to be used may be predefined by the base station via corresponding configuration requests 40, 41, 42 in such a manner that the compression algorithms used by PDCP protocol entity 35 to be configured may always correspond to a decompression algorithm in base station 16, in order to be able to decompress the protocol control information or user data compressed by PDCP protocol entity 35 to be configured. Furthermore, for the same reason, the compression parameter used by PDCP protocol entity 35 to be configured may also be used for decompression in base station 16. In addition, the packet data stream multiplexed by PDCP protocol entity 35 to be configured is transmitted as a user data stream to base station 16 and is demultiplexed there as a function of the multiplexing properties of PDCP protocol entity 35 to be configured, in order to be able to distribute the user data stream received to the appropriate PDP contexts in network layer 6 of base station 16.

What is claimed is:

1. A method for establishing a protocol entity in a convergence protocol layer of a first wireless station, comprising:
   receiving a radio bearer setup message from a second wireless station, wherein the radio bearer setup message includes an identifier for a compression algorithm, a compression parameter, and a protocol entity ID;
   in response to receiving the radio bearer setup message, configuring the protocol entity having the protocol entity ID in the convergence protocol layer of the first wireless station according to the following:
       configuring the protocol entity to include the compression algorithm configured to use the compression parameter and to communicate with at least one packet data protocol context in a network layer, wherein the protocol entity ID identifies the protocol entity from any other protocol entity that may be configured in the convergence protocol layer, and
       providing a radio bearer to allow communication between the protocol entity and an entity in an RLC (radio link control) layer, wherein there is a one to one relationship between the protocol entity and the radio bearer; and
   transmitting a radio bearer setup complete message confirming the establishment of the protocol entity to the second wireless station, wherein the radio bearer setup complete message includes the protocol entity ID.

2. The method of claim 1, further comprising:
transmitting a UE (user equipment) capability message to the second wireless station, wherein the UE capability message indicates the compression algorithm and the compression parameter are supported by the first wireless station prior to receiving the radio bearer setup message.

3. The method of claim 1, further comprising:
receiving a radio bearer reconfiguration message transmitted by the second wireless station, wherein the radio bearer reconfiguration message includes the protocol entity ID and identifies a second compression algorithm and a second compression parameter, wherein at least one of the second compression algorithm and the second compression parameter in the radio bearer reconfiguration message differs from the compression algorithm and the compression parameter included in the radio bearer setup message.

4. The method of claim 3, further comprising:
in response to receiving the radio bearer reconfiguration message, reconfiguring the protocol entity in the convergence protocol layer of the first wireless station by reconfiguring the protocol entity to include the second compression algorithm configured to use the second compression parameter; and
transmitting a radio bearer reconfiguration complete message confirming the reconfiguration of the protocol entity to the second wireless station, wherein the radio bearer reconfiguration complete message includes the protocol entity ID.

5. The method of claim 3, further comprising:
determining that the protocol entity cannot be reconfigured as specified in the radio bearer reconfiguration message; and
transmitting a radio bearer reconfiguration failure message to the second wireless station, wherein the radio bearer reconfiguration failure message includes a reason that the protocol entity failed to reconfigure.

6. The method of claim 1, further comprising:
receiving a radio bearer release message transmitted by the second wireless station, wherein the radio bearer release message includes the protocol entity ID.

7. The method of claim 1, wherein the protocol entity ID corresponds to an identifier for the radio bearer.

8. The method of claim 7, wherein the configuration request also requests configuration of the radio bearer associated with the protocol entity.

9. A first wireless station, comprising:
a computing device; and
a mobile wireless communication device connected to the computing device, the mobile wireless communication device configured to transmit and receive communications via a mobile wireless network;
wherein the mobile wireless communication device is configured to receive a radio bearer setup message from a second wireless station, wherein the radio bearer setup message includes an identifier for a compression algorithm, a compression parameter, and a protocol entity ID;
wherein the computing device is configured to configure a protocol entity having the protocol entity ID in a convergence protocol layer of the first wireless station in response to the mobile wireless communication device receiving the radio bearer setup message according to the following:
configuring the protocol entity to include the compression algorithm configured to use the compression parameter and to communicate with at least one packet data protocol context in a network layer, wherein the protocol entity ID identifies the protocol entity from any other protocol entity that may be configured in the convergence protocol layer, and;
providing a radio bearer to allow communication between the protocol entity and an entity in an RLC (radio link control) layer, wherein there is a one to one relationship between the protocol entity and the radio bearer; and
wherein the mobile wireless communication device is configured to transmit a radio bearer setup complete message confirming the establishment of the protocol entity in the first wireless station to the second wireless station, wherein the radio bearer setup complete message includes the protocol entity ID.

10. The first wireless station of claim 9, wherein the computing device is configured to establish the protocol entity in a user plane and to receive the radio bearer setup message and transmit the radio bearer setup complete message via a control plane.

11. The first wireless station of claim 9, wherein the computing device is configured to reconfigure the protocol entity in response to the mobile wireless communication device receiving a radio bearer reconfiguration message from the second wireless station, wherein the radio bearer reconfiguration message includes the protocol entity ID.

12. The first wireless station of claim 9, wherein the computing device is configured to release the protocol entity in response to the mobile wireless communication device receiving a radio bearer release message from the second wireless station, wherein the radio bearer release message includes the protocol entity ID.

13. The first wireless station of claim 9, wherein the mobile wireless communication device is configured to transmit a UE (user equipment) capability information message indicating at least one protocol entity parameter supported by the first wireless station to the second wireless station.

14. The first wireless station of claim 9, wherein the protocol entity ID corresponds to an identifier for the radio bearer.

15. The method of claim 14, wherein the configuration request also requests configuration of the radio bearer associated with the protocol entity.

* * * * *